Aug. 7, 1945.    M. F. BATES    2,380,932
GYRO-MAGNETIC COMPASS
Filed Nov. 11, 1942
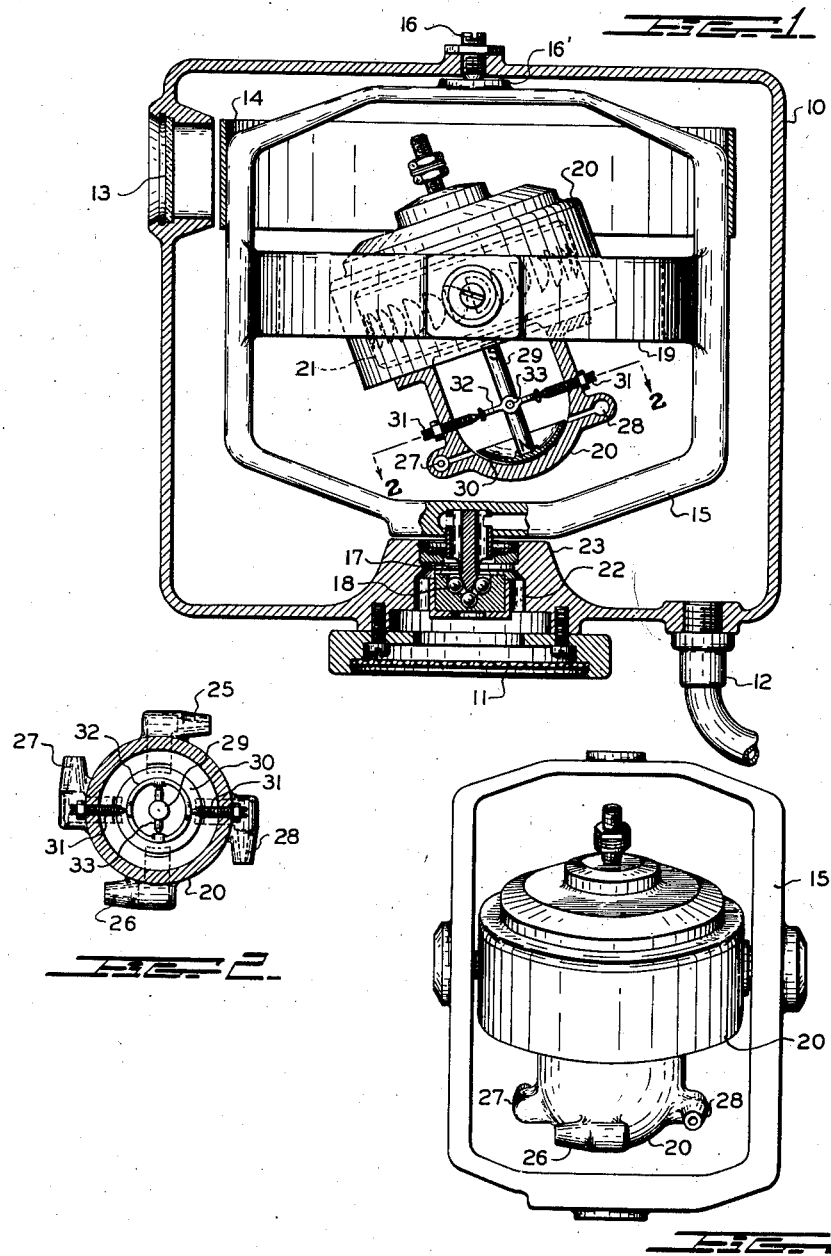
INVENTOR
M. F. BATES
BY
*Herbert H. Thompson*
HIS ATTORNEY Patented Aug. 7, 1945

2,380,932

UNITED STATES PATENT OFFICE 2,380,932

GYRO MAGNETIC COMPASS

Mortimer F. Bates, Brooklyn, N. Y., assignor to Sperry Gyroscope Company, Inc., Brooklyn, N. Y., a corporation of New York Application November 11, 1942, Serial No. 465,291

6 Claims. (Cl. 33—226)

This invention relates to a gyro instrument having meridian indicating properties.

The primary feature of the invention resides in the provision of control means for a gyro instrument for positioning the spin axis of the rotor thereof in aligned relation to the earth's magnetic field. By this defined position of the gyro rotor case in space, the instrument obtains its direction indicating qualities. As hereinafter pointed out, the improved instrument constitutes a special form of gyro magnetic compass.

Other features and structural details of the invention will be apparent from the following description when read in relation to the accompanying drawing wherein Fig. 1 is a side elevation of a gyro instrument constructed in accordance with the present invention, the casing of the instrument being shown in section.

Fig. 2 is a section view taken on line 2—2, Fig. 1, and

Fig. 3 is a detail front elevation showing the rotor bearing case of the improved gyro instrument mounted for movement directly on a vertical ring.

With particular reference to Figs. 1 and 2, the improved gyro instrument illustratively depicted therein is of pneumatically operated and controlled type that includes an air tight outer housing or casing 10 into which atmospheric air is admitted by way of filter 11. Air is evacuated from the interior of the housing by a suitable suction means (not shown) by way of exhaust hose connection 12. The front wall of the housing 10 includes a window 13 which may have a suitable lubber line (not shown) thereon. The observer of the instrument views a compass card 14 through the window 13 in reading the card with reference to the lubber line. Card 14 is fixedly mounted, in this instance, on the vertical ring 15 of the gyro instrument. Ring 15 is mounted for pivotal movement about a vertical axis within the housing 10 by means of pin 16 which projects inwardly from the top wall of the housing and a cooperating bearing 16' in the ring. Hollow trunnion 17 at the base of the ring 15 and cooperating bearing 18 in the housing 10 are included in the pivotal mounting of the vertical ring 15.

A second ring 19 is fixedly mounted in a suitable manner, between the oppositely disposed upwardly extending arms of the vertical ring. Ring 19 is situated in a horizontal plane perpendicular to the axis of the vertical ring 15. The rotor bearing case or frame 20 of the gyro instrument is mounted in a conventional manner for movement about a normally horizontal axis within the fixed ring 19, the axis of the case being perpendicular to the axis of the vertical ring and lying in the fixed horizontal plane of ring 19. The gyro rotor 21 is contained within the case on suitable bearings (not shown) which define the spin axis thereof. The rotor may be of the air spun type having peripheral buckets on which air is directed from a nozzle or nozzles contained within the case and not shown herein. Such an arrangement is well known in the art and being conventional and not a part of the present invention is not illustrated in detail herein. Air is supplied to the nozzles from the atmosphere by way of filter 11, passageways 22 in the hub 23 at the base of the housing 10 into the hollow trunnion 17 and thence by way of suitable passageways (not shown) in the rings 15 and 19 to the case 20.

Pneumatic means are provided in the present instance for controlling the rotor case, the same being operable to exert a torque about either or both of the axes of the case and vertical ring 15 in a conventional manner. The air spent in spinning the gyro rotor is withdrawn from the interior of the case 20 by way of the paired oppositely disposed ports or nozzles 25, 26 and 27, 28 from which it passes into the interior of housing 10. As shown in the present instance, the respective ports are provided by nozzle pieces which are connected to the bottom portion of the hollow cylindrical case 20 to direct the air issuing therefrom tangentially in opposite relation for each of the paired nozzles. Air issuing from nozzles 27 and 28 exerts a torque about the axis of ring 15 while air issuing from nozzles 25 and 26 exerts a torque about the axis of the case 20.

In accordance with the teaching of the present invention, the torque exerting means for the gyro instrument which positions the spin axis of the gyro rotor or the case 20 is controlled by a magnetic means which operates to normally position the spin axis of the gyro rotor in aligned relation to the earth's magnetic field. As shown, the control means includes a bar magnet 29 and a spherical or cup shaped shutter 30 whose rim normally bisects the ports in the case 20 leading to the respective nozzles 25, 26 and 27, 28. In normal relation of the parts, it will be understood that the air jets issuing from respective pairs of the nozzles are equal and oppositely directed. Consequently, at this time, the torque exerting means is ineffectively conditioned. Magnet 29 and shutter 30 are universally mounted within the case 20 on a jewel support provided by pins 31, gimbal ring 32 and pivot shaft 33. Further, the magnet and shutter are arranged in the universal support with substantially neutral equilibrium so that the magnet is free to take a position in alignment with the earth's magnetic field. The universally mounted dip needle 29 is self locating. Because of the consequent positioning of the shutter element 30, the torque exerting means is controlled in such a manner as to position the spin axis of the gyro rotor in coaxial relation to the bar magnet 29 and also in aligned relation to the earth's magnetic field. The rotor bearing case 20 is consequently situated in an inclined position about its horizontal axis in which the same is perpendicular to the earth's magnetic field. To assume this position the gyroscope must precess around its vertical axis until the vertical plane containing the spin axis, i. e. the vertical plane of the vertical ring 15 lies in the magnetic meridian. Hence the compass card 14 will show the magnetic north and the device behaves as a gyro magnetic compass. Also, the angle made by the spin axis with the horizontal ring 19 constitutes the dip angle of the earth's magnetic field.

In the modification of the invention shown in Fig. 3, the rotor bearing case is directly mounted for pivotal movement about a horizontal axis on the vertical ring 15', thus eliminating the fixed ring 19. With this arrangement of the parts, pneumatic nozzles 27 and 28 are effective to exert a torque about the axis of the case 20 and nozzles 25 and 26 are directly effective to exert a torque about the axis of the vertical ring 15'. In both forms of the invention, the directional reference providing ring is positioned in azimuth by the inclined gyro rotor bearing case 20 which in maintaining its position with the spin axis of the rotor in alignment with the earth's magnetic field maintains the vertical ring oriented in azimuth.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gyro magnetic compass including a rotor frame mounted for pivotal movement about vertical and horizontal axes, a rotor carried by said frame having a spin axis, means for precessing said frame about said vertical and horizontal axes, and universally mounted magnetic means in the earth's field operable to control said precessing means to position the spin axis of the rotor in aligned relation to the earth's field.

2. In a gyro instrument, a rotor mounted in a frame for movement about three normally mutually perpendicular axes, namely, spin, vertical and horizontal axes, means for exerting a torque about said vertical axis, means for exerting a torque about said horizontal axis, and means for controlling the respective torque exerting means to align the spin axis of the rotor with the earth's field including a magnet in the earth's field supported in substantial neutral equilibrium on a universal mounting.

3. A gyro instrument as claimed in claim 2, in which the universal mounting for the magnet is situated on the frame mounting said rotor.

4. A gyro instrument having a casing, a directional reference providing ring mounted in said casing for movement about a vertical axis, a rotor bearing frame mounted on said ring for movement about a horizontal axis, a rotor carried by said frame having a spin axis, means for exerting a torque about the axis of the ring, means for exerting a torque about the axis of the frame, and universally mounted magnetic means in the earth's field operable to control said respective torque exerting means to position the spin axis of the rotor in aligned relation to the earth's field.

5. A gyro magnetic compass having a casing with a window therein, a ring mounted in said casing for movement about a vertical axis, a compass card observable through said window controlled by said ring, a rotor bearing frame mounted on said ring for movement about a horizontal axis, a rotor carried by said frame having a spin axis, means for exerting a torque about the axis of the ring, means for exerting a torque about the axis of the frame, and means for controlling the respective torque exerting means to align the spin axis of the rotor with the earth's field and thereby cause said card to show the magnetic meridian including a universally mounted magnet in the earth's field.

6. A gyro instrument as claimed in claim 5, in which the respective torque exerting means are pneumatic and the controlling means therefor is a combined shutter and magnet that is universally mounted on the frame in neutral equilibrium.

MORTIMER F. BATES.